United States Patent [19]

Nakai

[11] Patent Number: 4,974,172
[45] Date of Patent: Nov. 27, 1990

[54] IMAGE PROCESSING APPARATUS

[75] Inventor: Yoshiyuki Nakai, Yamatokoriyama, Japan

[73] Assignee: Sharp Kabushiki Kaisha, Osaka, Japan

[21] Appl. No.: 341,852

[22] Filed: Apr. 24, 1989

[30] Foreign Application Priority Data

Apr. 28, 1988 [JP] Japan .................... 63-105987

[51] Int. Cl.$^5$ ............................................ G06F 3/153
[52] U.S. Cl. ................................. 364/521; 340/703; 340/747
[58] Field of Search .................. 364/518, 521, 523; 340/703, 728, 730, 735, 739, 747, 748, 750, 751

[56] References Cited

U.S. PATENT DOCUMENTS

| 4,199,815 | 4/1980 | Kyte et al. ............... 340/728 X |
| 4,626,838 | 12/1986 | Tsujioka et al. ............... 340/744 |
| 4,849,907 | 7/1989 | Aotsu et al. ............... 340/747 X |

FOREIGN PATENT DOCUMENTS 62-282380 12/1987 Japan .
63-64089 3/1988 Japan .

Primary Examiner—David L. Clark

[57] ABSTRACT

An image processing apparatus of the present invention is so arranged that the outline of a figure is represented with an outline vectors, and outline is created from the outline vectors. The contents of the outline may then be painted out. It is free from painting-out and deformation errors of the figures. Accordingly, an outline, free from painting-out errors caused with respect to the outline vectors may be created so that the figure which has been painted out is not changed from the initial figure.

2 Claims, 7 Drawing Sheets

Fig./(a)   Fig./(b)
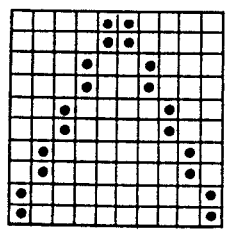 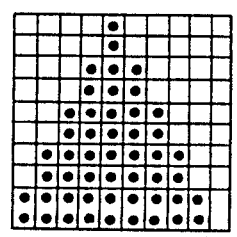
| Fig. 2 (a) | Fig. 2 (b) | Fig. 2 (c) | Fig. 2 (d) |
|---|---|---|---|
| 10010000 | 001100 | 10000001 | 010010 |
| 10001000 | 001100 | 10000001 | 110011 |
| 10000100 | 010010 | 10010011 | 110011 |
| 10000010 | 100001 | 10010011 | 110011 |
| 10000001 | 100010 | 10010000 | 010010 |
| Fig. 3 (a) | Fig. 3 (b) | Fig. 3 (c) | Fig. 3 (d) |
|---|---|---|---|
| 11100000 | 001000 | 11111110 | 011100 |
| 11110000 | 001000 | 11111110 | 100010 |
| 11111000 | 011100 | 11100010 | 100010 |
| 11111100 | 111110 | 11100010 | 100010 |
| 11111110 | 111100 | 11100000 | 011100 |

| | 1 | 2 | 3 | 4 | 5 |
|---|---|---|---|---|---|
| 7 | 0 | 0 | 1 | 1 | 0 |
| 6 | 0 | 0 | 1 | 1 | 0 |
| 5 | 0 | 0 | 1 | 1 | 0 |
| 4 | 0 | 0 | 1 | 1 | 0 |
| 3 | 0 | 0 | 1 | 1 | 0 |

Fig. 6 (c)

| | 1 | 2 | 3 | 4 | 5 |
|---|---|---|---|---|---|
| 7 | 0 | 0 | 1 | 0 | 0 |
| 6 | 0 | 0 | 1 | 0 | 0 |
| 5 | 0 | 0 | 1 | 0 | 0 |
| 4 | 0 | 0 | 1 | 0 | 0 |
| 3 | 0 | 0 | 1 | 0 | 0 |

| | 1 | 2 | 3 | 4 | 5 | 6 | 7 |
|---|---|---|---|---|---|---|---|
| 7 | 0 | 0 | 1 | 1 | 1 | 0 | 0 |
| 6 | 0 | 0 | 1 | 1 | 1 | 0 | 0 |
| 5 | 0 | 0 | 1 | 1 | 1 | 0 | 0 |
| 4 | 0 | 0 | 1 | 1 | 1 | 0 | 0 |
| 3 | 0 | 0 | 1 | 1 | 1 | 0 | 0 |

Fig. 7 (c)

| | 1 | 2 | 3 | 4 | 5 | 6 | 7 | 8 |
|---|---|---|---|---|---|---|---|---|
| 7 | 0 | 0 | 1 | 0 | 1 | 1 | 1 | 1 |
| 6 | 0 | 0 | 1 | 0 | 1 | 1 | 1 | 1 |
| 5 | 0 | 0 | 1 | 0 | 1 | 1 | 1 | 1 |
| 4 | 0 | 0 | 1 | 0 | 1 | 1 | 1 | 1 |
| 3 | 0 | 0 | 1 | 0 | 1 | 1 | 1 | 1 |

Fig. 7 (d)

| | 1 | 2 | 3 | 4 | 5 | 6 | 7 |
|---|---|---|---|---|---|---|---|
| 7 | 0 | 0 | 1 | 0 | 1 | 0 | 0 |
| 6 | 0 | 0 | 1 | 0 | 1 | 0 | 0 |
| 5 | 0 | 0 | 1 | 0 | 1 | 0 | 0 |
| 4 | 0 | 0 | 1 | 0 | 1 | 0 | 0 |
| 3 | 0 | 0 | 1 | 0 | 1 | 0 | 0 |

Fig. 7 (e)

| | 1 | 2 | 3 | 4 | 5 | 6 | 7 |
|---|---|---|---|---|---|---|---|
| 7 | 0 | 0 | 1 | 1 | 0 | 0 | 0 |
| 6 | 0 | 0 | 1 | 1 | 0 | 0 | 0 |
| 5 | 0 | 0 | 1 | 1 | 0 | 0 | 0 |
| 4 | 0 | 0 | 1 | 1 | 0 | 0 | 0 |
| 3 | 0 | 0 | 1 | 1 | 0 | 0 | 0 |

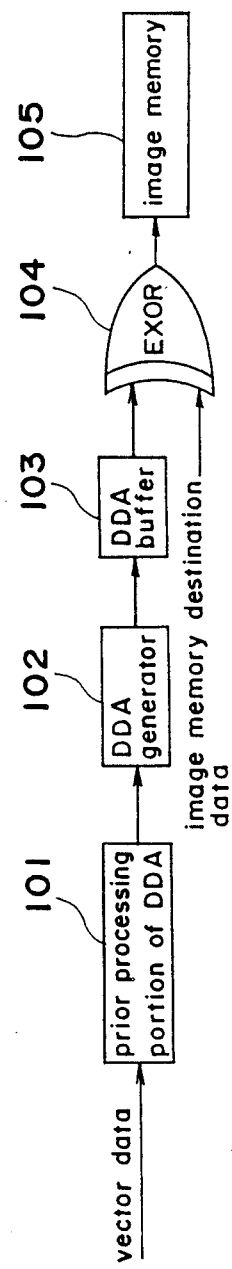

(a)

(b)

(a)

(b)

Fig. 17 (a)   Fig. 17 (b)
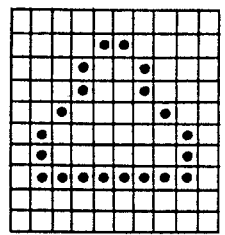 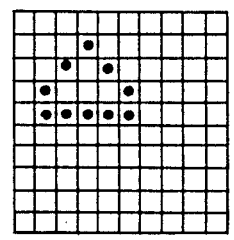
Fig. 18 (a)   Fig. 18 (b)   Fig. 18 (c)
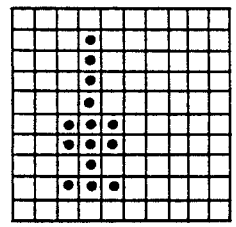 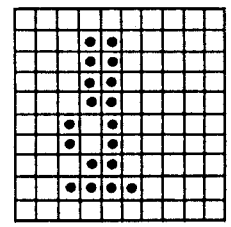 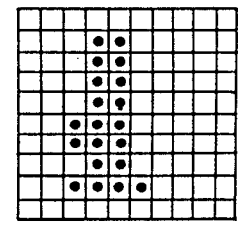
Fig. 19 (a)   Fig. 19 (b)   Fig. 19 (c)   Fig. 19 (d)
```
①①①            ①         1 1 1 1 1 1 1      ①①①
1     1         ①         1  figure  1       ①       ①
1       1       ① 1       1   1 1 1 1 1      ①  hole ①
1 figure 1      1 figure 1   1   1 hole ①    ①       ①
①①①①①①①       1 1 1 1      1 1 1 1 1 1 1      ①①①
```

IMAGE PROCESSING APPARATUS

BACKGROUND OF THE INVENTION

The present invention generally relates to an image processing apparatus arranged such that the outline of a figure is represented with outline vectors, and can be created from the outline vectors upon painting out the internal region of the outline.

Conventionally, a seed filling method or a scan filling method is known as a method of painting out an optional region of the figure. Although the seed filling method is adopted in many image processors, it has a defect in that the processing speed is slower a comparison to the scan filling method. In the scan filling method, it is so arranged that the outline of the figure to be painted out as shown in FIG. 11, for example, is shown with the outline vectors, and the figure is adapted to be painted out when the directions of the outline vectors are painted out on the left side thereof. The outline vectors shown in FIG. 12 (b) are created from the initial data shown in, for example, FIG. 12(a). Such an outline as shown in FIG. 13(a) is created from the outline vectors of FIG. 12(b). In the scanning operation in the x direction, the painting-out operation starts at odd-numbered intersections between the horizontal scanning lines and the outline. Subsequently, the painting-out operation is stopped at the even-numbered intersections, and thereby results in such a figure as shown in FIG. 13(b).

An image processing apparatus, arranged such that the figure is painted out by such a scan filling method as described hereinabove, is conventionally disclosed in Japanese Pat. Publication Tokkosho No. 53-41017. The image processing apparatus creates the outline in accordance with the known Bresenham algorithm from the outline vectors, and, for example, the outlines as shown in FIG. 14(a), FIG. 15(a), and FIG. 16(a) are provided.

In the scanning operation in the x direction, the painting-out operation starts in the odd-numbered intersections between the horizontal scanning lines and the outlines, with the intersected picture elements being painted out. The painting-out operation is stopped at the even-numbered intersections, with the painting-out operation being effected so far as the intersected picture elements.

In case of creating the outline by the conventional image processing apparatus, the position of the picture element becomes the outline when the outline vectors overlaps on the same picture element as at the top portion in FIG. 14(a) and at the central portion in FIG. 15(a). When the horizontal scanning line is intersected by the outline, all the picture elements on the right side thereof including the picture element, are painted out. Thus painting out errors as shown in FIG. 14(b) and FIG. 15(b), are caused. If the outline ends in the odd-numbered picture element, counted from the initial picture element the scanning line intersects when the outline parallel to the scan direction is created, as shown in FIG. 16(a), the picture element on the right side of the odd-numbered picture element is painted out. This causes such painting out errors as shown in FIG. 16(b).

In order to prevent such errors from being caused, the processing operation is effected such that the position of the picture element deviated by one dot in the x-axial direction from the outline of the top portion may be outlined as shown in, for example, FIG. 13(a). In the outline parallel to the scanning direction, the processing operation is effected such that the length may become an even-number dots or only a start point and an end paint are plotted. In this case, the processing speed of a host effecting the processing operating becomes slower, with the load of the host becoming larger. When the outline is contracted or rotated, with the outline obtained through the processing operation effected on the vector font being stored in a mask ROM, etc., for example, when the outline shown in FIG. 17(a) is contracted with that shown in FIG. 17(b), such painting out errors as described hereinabove, may be caused. When the processing is effected for the outline shown in FIG. 18(a), the outline becomes that such as one shown in FIG. 18(b). When it is painted out, the outline becomes one such as that shown in FIG. 18(c), so that a figure of a different shape is created from the figure shown in FIG. 18(a).

The outline, wherein errors are caused or shapes are made different when such a painting-out operation has been effected, as shown, as a typical example, in FIG. 19. The outlines shown in FIG. 19(a) and 19(b) are the same as those shown in FIG. 14(a) and FIG. 16(a). FIG. 19(c) shows a case, wherein two boundaries share the same picture element. FIG. 19(d) shows a case, wherein two boundaries are in complete conformity with each other as a limit of FIG. 19(c). The outline surrounded by a circle mark shows one, which causes the error.

In the conventional image processing apparatus, to produce such outline as shown in FIG. 19 during the outline creation, it is necessary to effect such a processing operation upon the outline for preventing the errors from being caused during the figure painting-out operation, with a problem being caused of the processing speed becoming slower. In order to apply the processing, the figure shape after the painting out becomes considerably different from the initial figure, thus being more variable in magnification than the dot font, and a problem is caused that the characteristics of the vector font, with the rotation being easier and the font being beautiful, and cannot be sufficiently used.

SUMMARY OF THE INVENTION

Accordingly, an object of the present invention is to provide an improved image processing apparatus which is free from the painting-out errors of the figures and the deformation of the figures.

In accomplishing the above-described object, according to a first invention, there is provided an image processing apparatus which is arranged so that the outline of the figure is represented with outline vectors. The figure may be painted out when the directions of the outline vectors are painted out on the left sides of the outline vectors and the outline is created from the outline vectors. The painting-out operation starts at the odd-numbered intersections between the outline and the horizontal scanning lines by the scanning operation in the x-axial direction. The painting-out operation is further stopped at the even-numbered intersections. The device is characterized in that there are provided a vector variation amount deciding device which decides whether the y-axial variation amount of the outline vector is negative, zero or positive when the outline is created from the outline. It further includes an outline creating device which creates the outline in accordance with the Bresenham algorithm if the y-axial variation amount of the outline vectors is negative and does not create the outline if the y-axial variation amount of the outline vectors is zero. The outline is created in a position shifted by one dot in the x-axial direction from the position to be decided by the Bresenham algorithm if the y-axial variation amount of the outline victors is positive painting device is included which starts the painting-out operation at the odd-numbered intersections between the outline created by the outline creating device and the horizontal scanning lines so as to paint out including even the intersected picture elements, and suspends the painting out at the even-numbered intersections so as to paint out so far as the picture element immediately before the picture elements intersected at the even numbers.

Also, according to a second embodiment of the present invention, an image processing apparatus is provided which is arranged so that the outline of the figure is represented by outline vectors, and the figure may be painted out when the directions of the outline vectors are painted out on the left sides of the outline vectors. The outline is created from the outline vectors. The painting-out operation starts at the odd-numbered intersections between the outline and the horizontal scanning lines by the scanning operation to the x-axial direction. Further, the painting-out operation is stopped at the even-numbered intersections. The device is characterized in that a vector variation amount deciding device is provided which decides whether the y-axial variation amount of the outline vector is zero when the outline is produced from the outline. Further, outline creating device creates the outline in accordance with the Bresenham algorithm if the y-axial variation amount of the outline vectors is not zero, and does not create the outline if the y-axial variation amount of the outline vectors is zero. Next, a corrected outline creating device the stores exclusive or, as the corrected outline, in an amount of the member necessary for the outline created by the outline creating means device data. The accommodated in an address corresponding to the position of the outline of the memory so as to accommodate the corrected outline in the address of the memory. Also a painting device reads the corrected outline accommodated in the memory so as to start the painting-out operation at the odd-numbered intersections between the corrected outline and the horizontal scanning lines so as to paint out, including even the intersected picture elements, upon suspending the painting out at the even-numbered intersections as to paint out so far as the intersected picture element.

In the first preferred embodiment of the present invention, when the outline is created from the outline vectors, the vector variation-amount deciding device decides whether the y-axial variation. amount of the outline vectors is negative, zero or positive, Then outline creating device creates the outline in accordance with the algorithm of the Bresenham if the y-axial direction variation amount of the outline vectors is negative and does not create the outline if the y-axial variation amount of the outline vectors is zero. It further creates the outline in a position shifted by one dot in the x-axial direction from the position decided by the algorithm of the Bresenham if the y-axial variation amount of the outline vectors is positive. Subsequently the painting device starts the painting-out operation at the odd-numbered intersections between the outline created by the outline creating device and the horizontal scanning lines so as to effect the painting out operation, including the intersected picture element, and suspends the painting-out operation at the even-numbered intersections. The device with paint out as far as the picture element, immediately before the intersected picture element at the even number.

Also, in the second embodiment of the present invention, when the outline is created from the outline vectors, the vector variation amount deciding device decides whether the y-axial variation amount of the outline vectors is zero, the outline creating device creates the outline in accordance with the algorithm of the Bresenham if the y-axial direction variation amount of the outline vectors is not zero, and does not create the outline if the y-axial variation amount of the outline vector is zero. Then a corrected outline creating device, stores as a corrected outline, the exclusive or between the outline created by the outline creating means and the data accommodated in an address corresponding to the position of the outline of the memory, so as to accommodate the corrected outline in the address of the memory. Next, a painting-out device reads the corrected outline accommodated in the memory so as to start the painting out operation at the odd-numbered intersections between the corrected outline and the horizontal scanning lines so as to paint out, including even the intersected picture elements, upon suspending the painting out at the even-numbered intersections. Thus the device will paint out as far as the intersected picture element.

Accordingly, in both the first and the second embodiment of the present invention, no error of painting out the figure is caused and the painted-out figure is not deformed from the initial figure.

BRIEF DESCRIPTION OF THE DRAWINGS

These and other objects and features of the present invention will become apparent from the following description taken in connection with the preferred embodiment thereof with reference to the accompanying drawings, in which;

FIGS. 1 to 3 respectively show schemes relating to outlines created by a present embodiment of the first invention and the painted-out figures;

FIG. 6 and 7 are views of outline vectors contracted into one dot in the x-axial direction in the first embodiment, the outline created in accordance with the outline vectors and the figure painted out;

FIG. 8 is a view showing outline vectors for illustrating a present embodiment of the second invention;

FIG. 9 is a view showing a corrected outline created in accordance with the outline vectors of FIG. 8;

FIG. 10 is a block diagram of a circuit for creating the corrected outline from the outline vectors in the second embodiment;

FIG. 17 shows a view showing a case wherein the contracted outline in the conventional embodiment becomes the outline causing the painting-out error;

FIG. 18 shows a view illustrating the deformation of the figure in the conventional embodiment; and FIG. 19 shows a view showing a typical example of the outline with the painting-out errors in the abovedescribed conventional embodiment being caused therein.

DETAILED DESCRIPTION OF THE INVENTION

Figure 4:
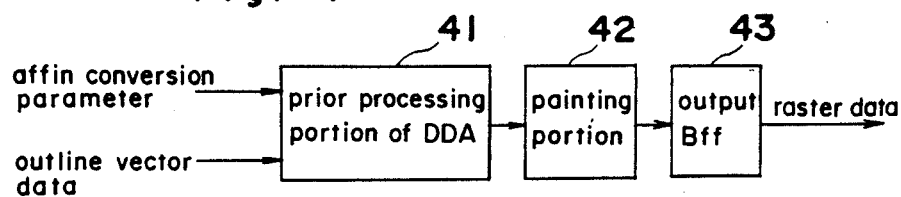
FIG. 4 is a block diagram of a circuit for creating the outline from the outline vectors in the first embodiment.

Before the description of the present invention proceeds, it is to be noted that like parts are designated by like reference numerals through the accompanying drawings.

FIRST EMBODIMENT

Figure 14:
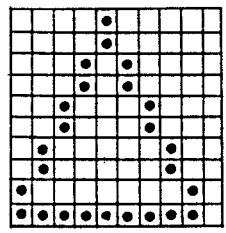
FIGS. 14 to 16 are respectively views each showing the outline created by the conventional picture processing apparatus and the figure with painting-out errors being caused therein.
Figure 14:
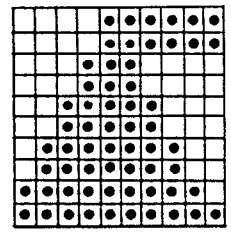

FIG. 1(a) and FIGS. 2(a),(b),(c),(d) are examples of the outlines operated by an image processing apparatus in a first embodiment of the present invention, respectively, corresponding to FIG. 14(a) and FIGS. 19(a),(b),(c),(d) in the conventional apparatus.

The image processing apparatus as shown in these outlines creates the outline in accordance with the algorithm of the Bresenham as in the conventional embodiment if the y-axial variation amount of the outline vector is negative and, does not create the outline if the y-axial variation amount of the outline vector is zero, i.e., (it is parallel to the x-shaft). Further, if the outline in a position shifted by one dot in the x-axial direction from the position decided by the algorithm of the Bresenham if the y-axial variation amount of the outline vector is positive.

Figure 15:
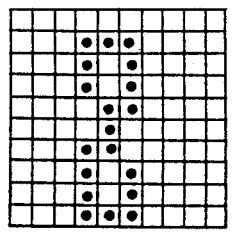
Figure 15:
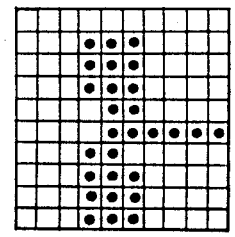
Figure 16:
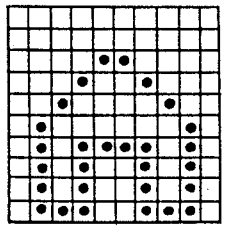
Figure 16:
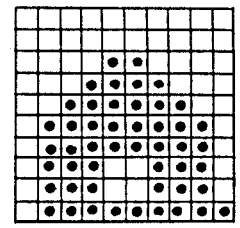

The painting-out operation starts at the odd-numbered intersections between the outline and the horizontal scanning lines by the scanning operation in the x-axial direction so as to effect the painting-out operation, including the intersected picture element. The painting-out operation is suspended at the even-numbered intersections only as to paint out so far as the picture element immediately before the picture element intersected at the even number. The figures shown with the outlines by such painting-out operation as described hereinabove are respectively painted out as shown in FIG. 1(b) and FIGS. 3(a),(b),(c),(d). This results in that such painting-out errors, as shown in FIG. 14(b), FIG. 15(b), FIG. 16(b) in the conventional embodiment, not being caused, and thus a figure as shown in FIG. 18, is not deformed.

Figure 5:
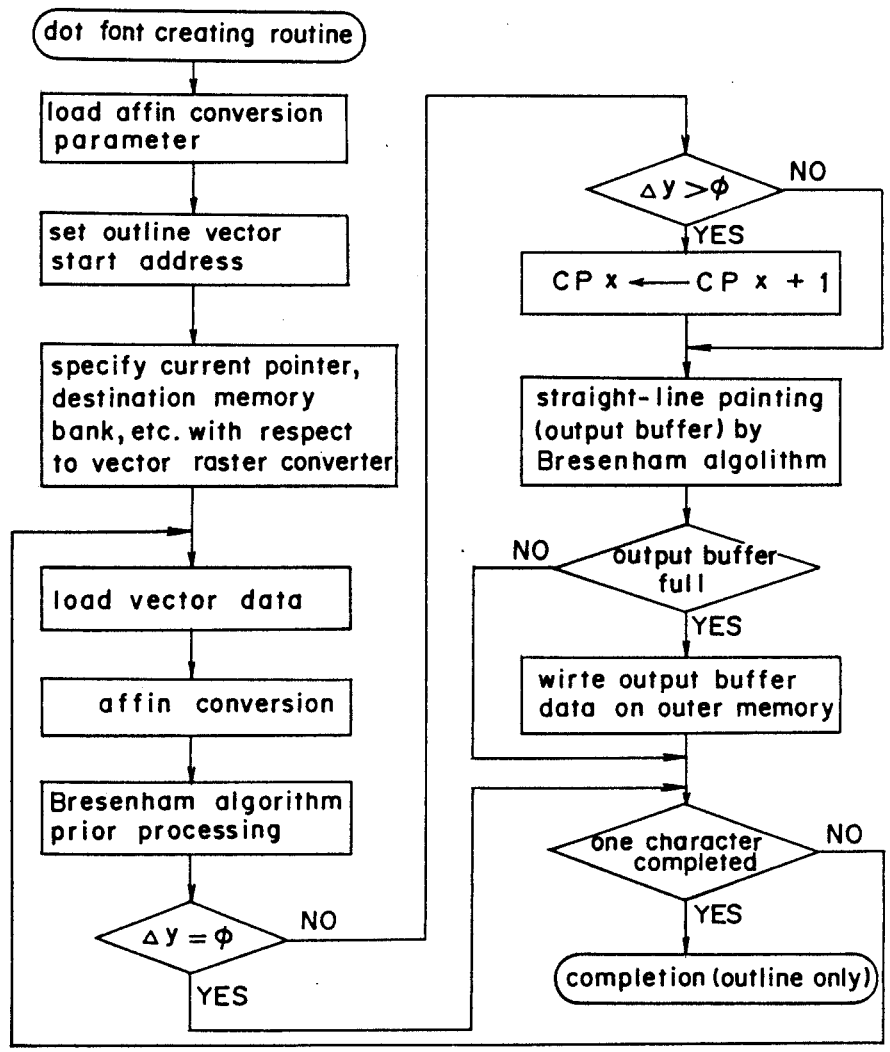
FIG. 5 is a flow chart showing an operation of the circuit.
Figure 11:
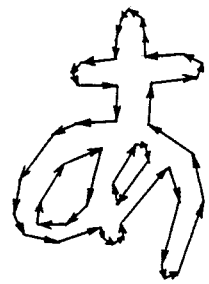
FIG. 11 is a view for illustrating outline vectors.
Figure 12:
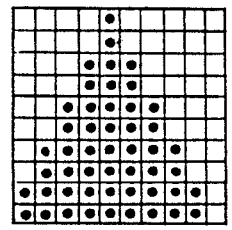
FIGS. 12 and 13 are views for illustrating the painting-out of a figure by the conventional scan filling method.
Figure 12:
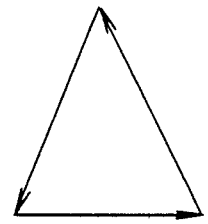
Figure 13:
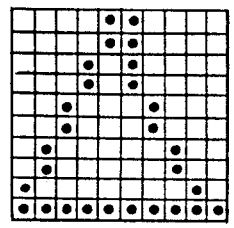
Figure 13:
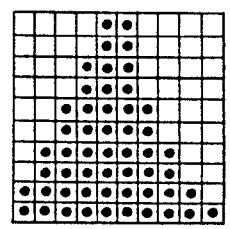

FIG. 4 is a block diagram showing the construction of a circuit for creating the outline (raster data) from the outline vector data, and FIG. 5 is a flow chart showing the operation of the circuit.

In FIGS. 4, and 5, the outline vector data stored in a mask ROM for example, and affix conversion parameters such as sin 0, Cos 0, Sx (x-direction variable magnification), Sy (y-direction variable magnification), etc. are inputted into the prior processing portion 41 of the DDA. The prior processing portion 41 of the DDA effects the affix conversion processing such as rotation, variable magnification, inclination, etc., in accordance with the affix conversion parameters, by a built-in multiplication unit and adder. The outline vector data already processed in the affix conversion are converted into x, y absolute addresses so as to effect the prior processing of the algorithm of the Bresenham. If the change in Δ y is positive in the prior processing of the algorithm of the Bresenham, the current pointer is shifted in one-dot x direction. If the Δ y is zero, the painting is not effected. If the y is negative, the current pointer is not shifted only by the prior processing of the algorithm of the Bresenham. Then, the processed data is outputted into the painting portion 42 of the Bresenham.

The painting portion 42 of the Bresenham stores, in accordance with the algorithm of the Bresenham, the data outputted from the prior processing portion 41 of the DDA into the internal output buffer. As the processing by the Δ y is effected in the prior processing portion 41 of the DDA, the consciousness is not necessary in the painting portion 42 of the Bresenham.

The data stored in the internal output buffer of the painting portion 42 of the Bresenham is moved into the output buffer 43. The outline (raster data) is outputted from the output buffer 43.

When the outline vector has been contracted by the affin conversion in the operation, the vectors may become such outline ones as shown in FIG. 6(a) and FIG. 7(a). In the case of FIG. 6(a), the outline becomes one as shown in FIG. 6(b). When the painting-out operation is effected in accordance with this outline, the outline becomes one as shown in FIG. 6(c), thus resulting in no problems. However, in the case of FIG. 7(a), the outline becomes one as shown in FIG. 7(b). When the painting-out operation is effected in accordance with the outline, the error is caused as shown in FIG. 7(c). Therefore, in the case of such outline vectors as described hereinabove, the painting-out operation is tried not to be effected so as to prevent the error.

SECOND EMBODIMENT

When the outline is created from the outline vectors, the image processing apparatus of a second embodiment of the present invention decides whether or not the y-axial variation amount of the outline vectors is zero. The image processing apparatus does not create the outline if the variation amount is zero, but creates the outline in accordance with algorithm of the Bresenham if it is not zero. The exclusive or between the outline and the data (hereinafter referred to as destination data), accommodated in the address corresponding to the position of the outline of the image memory, is provided as the corrected outline, which is accommodated in the address of the image memory. The image processing apparatus reads the corrected outline accommodated in the image memory, and effects the scanning operation in the x-axial direction to start the painting-out operation at the odd-numbered intersections between the corrected outline and the horizontal scanning lines for effecting the painting-out operation including the intersected picture element. However, the image processing apparatus suspends the painting-out operation at the even-numbered intersections so as to paint out as far as the intersected picture element.

FIG. 10 is a block diagram showing the construction for creating the corrected outline from the outline vectors in the image processing apparatus. This circuit creates the outline from the inputted outline vectors, by a prior processing portion 101 of the DDA, which effects the prior processing of the inputted vector data for the determination of the major shaft, and the other DDA operation, and a DDA generator 102, so as to paint it on the DDA buffer 103 composed of m x n dots. When the data are overflowed from the DDA buffer 103, the overflowed data are stored in the image memory 105. At this time, the exclusive or (EXOR) circuit 104 stores the corrected outline, as the result of the EXOR, on the image memory 105 by the read-modified-write, while taking the EXOR between the outline to be stored and the image memory destination data.

Suppose the outline vectors shown in FIG. 8(b) have been obtained with the outline vectors shown in FIG. 8(a) being divided by ten at both the x coordinates and y coordinates. In order to create the corrected outline from the outline vectors shown in FIG. 8(b), the painting region of the image memory 105 is cleared, as shown in FIG. 9(a). When the vectors V1 and V2 are painted in the image memory 105, taking the destination data (zero in this case) of the image memory 105 and the EXOR, the outline is provided as in FIG. 9(b). When the vectors V3 and V4 are painted in the image memory 105, taking the destination data (1 in this case) of the image memory 105 and the EXOR, they are provided as in FIG. 9(c).

As the corrected outline is not shown if the creating method of the corrected outline is applied to the outline vector shown in FIG. 7(a), such a painting-out error as shown in FIG. 7(c) is not caused.

According to the image processing apparatus, it is readily found out that such painting-out errors, as shown in FIG. 14(b), FIG. 15(b) and FIG. 16(b), and such a figure deformation as shown in FIG. 18(c), are not caused.

As is clear from the foregoing description, according to the image processing apparatus of the first embodiment or the second embodiment, the following effects are provided.

(1) In the embodiments, the outline, wherein the painting-out error is not caused, with respect to the outline vectors with painting-out error having been caused in the conventional one, may be created. Thus, the figure which has been painted out is not changed from the initial figure.

(2) As the outline may be created from the outline vectors only, without the help of the host, the high speed processing operation may be effected.

(3) As the outline may be created without causing the paint-out error if the outline is created after the variable magnification, rotation, etc. of the outline vectors having been processed, a plurality of size dot fonts may be provided from one vector font, so that the capacity of the memory may be reduced.

Although the present invention has been fully described by way of example with reference to the accompanying drawings, it is to be noted here that various changes and modifications will be apparent to those skilled in the art. Therefore, unless such changes and modifications otherwise depart form the scope of the present invention, they should be construed as included therein.

What is claimed is:

1. An image processing apparatus for processing the outline of a Figure, represented by outline vectors, and painting-out the figure when the directions of the outline vectors are painted out on the left sides of the outline vectors, the outline being created from the outline vectors, the painting-out operation starting at the intersections between the outline and odd-numbered horizontal scanning lines of a scanning operation in the x-axial direction, and stopping at the even-numbered intersections, the apparatus comprising:

vector variation amount deciding means for determining the y-axial variation amount of the outline vectors as one of negative, zero and positive upon the outline being created from the outline vectors;

outline creating means for creating the outline in accordance with the algorithm of the Bresenham if the y-axial variation amount of the outline vectors is determined to be negative, for not creating the outline if the y-axial variation amount of the outline vectors is determined to be zero, and for creating the outline in a position shifted by one dot in the x-axial direction from the position to be decided by the algorithm of the Bresenham if the y-axial variation amount of the outline vectors is determined to be positive; and painting means for starting the painting-out operation at the intersection between the outline created by the outline creating means and the odd-numbers horizontal scanning lines of the scanning operation so as to paint out, including the intersected picture elements, and for suspending the painting out operation at the even-numbered intersections so as to paint out only as far as the picture element immediately preceding the picture elements intersected at the even numbered horizontal scanning lines.

2. An image processing apparatus for processing the outline of a figure, represented by outline vectors, and painting-out the figure when the directions of the outline vectors are painted out on the left sides of the outline vectors, the outline being created from the outline vectors, the painting-out operation starting at the intersections between the outline and odd-numbered horizontal scanning lines of a scanning operation in the x-axial direction, and suspending the operation at the even-numbered intersections, the apparatus comprising:

vector variation amount deciding means for determining the y-axial variation amount of the outline vectors, the y-axial variation amount being determined as zero when the outline is created from the outline vectors;

outline creating means for creating the outline in accordance with the algorithm of the Bresenham upon the y-axial variation amount of the outline vectors being determined not to be zero, and for not creating the outline upon the y-axial variation amount of the outline vectors being determined to be zero;

corrected outline creating means for creating a corrected outline, the corrected outline being an exclusive or between the outline created by the outline creating means and data accommodated in an address corresponding to the position of the outline in a memory, and storing the corrected outline in the address of the memory;

painting means for reading the corrected outline from the memory and starting the painting-out operation at the intersections between the corrected outline created and odd-numbered horizontal scanning lines of the scanning operation so as to paint out, including the intersected picture elements, and for suspending the painting out at even-numbered intersections so as to paint out only as far as the intersected picture element.

* * * * *